United States Patent [19]

Olsson et al.

[11] 4,352,421

[45] Oct. 5, 1982

[54] ARRANGEMENT FOR THE ORIENTED FEEDING OUT OF CAPS

[75] Inventors: Alvar Olsson, Dalby; Peter Giacomelli, Lund, both of Sweden

[73] Assignee: Tetra Pak Developpement SA, Switzerland

[21] Appl. No.: 213,469

[22] Filed: Dec. 5, 1980

[30] Foreign Application Priority Data

Dec. 11, 1979 [SE] Sweden ........................... 7910169

[51] Int. Cl.³ .................... B65G 47/14; B65G 29/00
[52] U.S. Cl. .................................. 198/392; 198/396
[58] Field of Search ............. 198/391, 396, 397, 392, 198/393; 221/156, 167, 168, 172; 209/545

[56] References Cited

U.S. PATENT DOCUMENTS

| | | | |
|---|---|---|---|
| 3,147,843 | 9/1964 | Freidenrich | 198/392 |
| 3,318,434 | 5/1967 | Waller | 198/393 |
| 3,330,403 | 7/1967 | Roberts | 198/392 |

FOREIGN PATENT DOCUMENTS 159344 2/1979 Netherlands ..................... 198/392

*Primary Examiner*—Robert B. Reeves
*Assistant Examiner*—B. Bond
*Attorney, Agent, or Firm*—Burns, Doane, Swecker & Mathis

[57] ABSTRACT

An arrangement for the oriented feeding out of caps provided with pull-lugs comprises a disc which rotates at high speed, and onto the planar working surface of which the caps are dropped. By the rotation of the disc the caps are moved to the periphery of the disc where they contact a guide rail in the form of an uninterrupted ring which is arranged at such a distance above the surface of the disc that the cap is allowed to project beneath the guide rail. However, the lug on the cap prevents the cap from wholly passing under the guide rail. At a point along the ring periphery a radially movable feeding out element is provided which engages the passing caps and withdraws them via the space between the disc and the guide rail, with a short-time deformation of the pull-lug.

6 Claims, 2 Drawing Figures

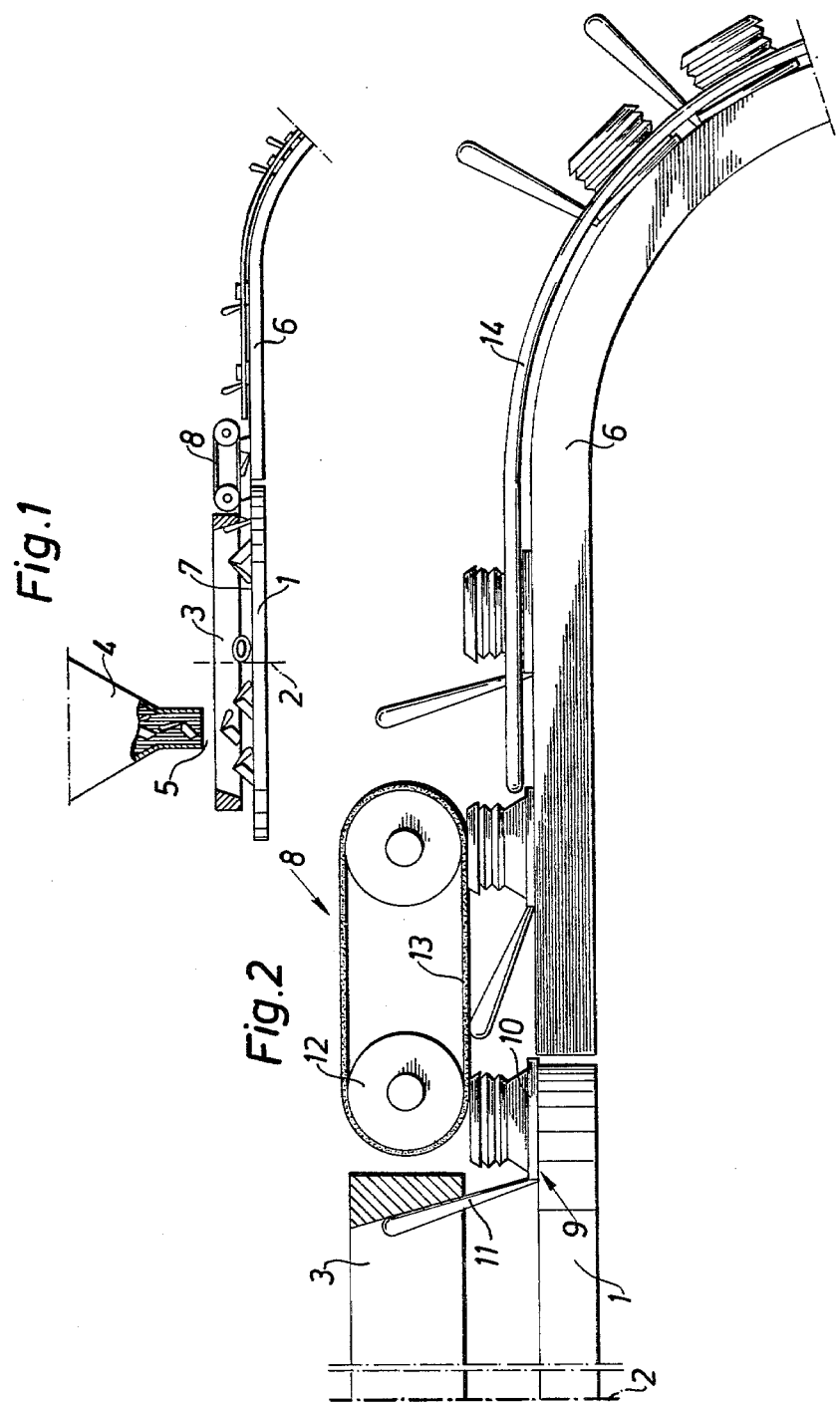

ARRANGEMENT FOR THE ORIENTED FEEDING OUT OF CAPS

BACKGROUND AND OBJECTS OF THE INVENTION

The present invention relates to an arrangement for the oriented feeding out of caps of the type comprising a cap body and a projection arranged at an angle thereto, which arrangement comprises a rotating disc with a plane working surface onto which the caps are fed in random orientation.

In the mechanical capping of bottles the caps are fed at a relatively high rate to the capping machine along a feed channel, which usually slopes along the greater part of its length so that the caps can be fed with the help of gravitational force. To enable the capping machine to function faultlessly and without interruption it is essential that the caps should be supplied in a uniform stream and in a certain, predetermined, orientation position. Incorrectly oriented or turned caps will invariably lead to stoppages, either because they hinder the feeding into the feed channel or because they cannot be gripped by the capping machine and applied to the bottles. The caps which are used are generally supplied ready-made in bags or boxes and an arrangement is required, therefore, which orientates and feeds out the caps so that they can be supplied to the feed channel without interruption in the correct orientation position.

The problem of orientation and feeding out is particularly great in the type of caps which beside the cap body itself also comprise a projection in the form of a pull-lug serving as an opening device, since such caps not only have to be turned to that they rest on the correct side but they also have to be twisted so that the lug ends up in the desired angular position.

Arrangements for this purpose known up to now comprise a funnel-shaped magazine into which the caps are emptied manually from the boxes or bags wherein they have been supplied. The magazine is arranged above a rotating horizontal disc and the caps, obtained via an opening in the magazine arranged in the vicinity of the centre of the rotating disc, drop down onto the rotating disc. Because of the centrifugal force the caps will be flung out towards the periphery of the disc where, owing to the rotation of the disc, they are made to slide along a stationary wall arranged at the periphery of the disc which prevents the caps from being flung off the disc. Owing to the friction against the wall or the disc the caps will be influenced and continuously alter their orientation position in a random manner until they end up in a relatively stable position, wherein the top side of the cap rests against the rotating disc and the lug points at an angle upwards. Since all other orientation positions, as a consequence of the lug extending at an angle from the cap, are unstable, all the caps successively will end up in this position. When the caps in this position slide along the wall or the guide rail arranged along the periphery of the disc, they are collected successively by guide plates which steer the caps out through an opening in the guide rail where a nozzle is provided which, with the help of a strong air jet drives the caps thus oriented further towards the opening of a feed channel which guides the caps to the capping machine.

It has been found in practice that this known orientation and feeding out arrangement feeds out a certain percentage of caps with the lug first instead of, as is desirable, feeding the caps with the cap body first and the lug last. To avoid disturbances in the capping machine it was necessary, therefore to provide the feed channel with a device which checks the position of the lug in relation to the cap body and removes incorrectly oriented caps.

It is a further adisadvantage of the known arrangement that the air jet which drives the caps from the opening in the guide rail to the input end of the feed channel causes an appreciable noise which is of course undesirable from a point of view of working environment. Finally, the feeding out from the rotating disc has proved to be very easily upset by caps of different function which means, among other things, that the feeding out is interrupted and can only be resumed again after manual cleaning of the outlet.

It is an object of the present invention to provide an arrangement for the oriented feeding out of caps, which arrangement is not subject to the disadvantages affecting the arrangements known up to now.

It is a further object of the present invention to provide an arrangement for the oriented feeding out of caps which arrangement has great operating reliability and completely eliminates incorrectly turned caps.

It is a further object of the present invention to provide an arrangement for the oriented feeding out of caps, which arrangement is simple, reliable in operation and inexpensive to manufacture.

These and other objectives have been achieved in accordance with the invention in that an arrangement of the rotating disc is provided with a guide rail in the form of an uninterrupted ring arranged coaxially with the disc and above the working surface of the same which is adapted to steer the caps driven by the rotation of the disc so that they are made to slide in an oriented position with the cap body under the guide rail and with the projection in contact against the guide rail. A feeding out element is arranged adjoining the guide rail in such a way that by engaging with the cap body it causes the longitudinally oriented caps to pass under the guide rail whilst at the same time bending down the projection.

This design eliminates the previously required opening in the guide rail and the guide plates and the air nozzle arranged at the opening. Instead the caps are fed out via a space between the guide rail and the rotating disc with the help of a feeding out element which positively engages and drives the caps out under the guide rail at the same time as the projection or pull-lug is bent down under the guide rail. Since caps of this type are made of a flexible plastic material the pull-lug will rapidly reassume its original shape. Owing to the absence of an opening in the guide rail, any wedging of caps and blockages is avoided when a great number of caps is steered at the same time towards the feeding out point. Instead the caps oriented in the correct position can continue to slide along the guide rail while waiting for the feeding out with the help of the feeding out element.

A preferred embodiment of the arrangement in accordance with the invention has been given moreover the characteristics which are evident from the subsidiary claims.

THE DRAWING

An embodiment of the arrangement in accordance with the invention will not be described in greater detail with special reference to the enclosed drawing.

FIG. 1 shows schematically and partly in section a side elevation of an arrangement in accordance with the invention, FIG. 2 shows schematically a part of FIG. 1 on a considerably larger scale and illustrates more particularly the feeding out element for feeding out of caps from the rotating disc to the opening of the feed channel.

DETAILED DESCRIPTION OF A PREFERRED EMBODIMENT OF THE INVENTION

FIG. 1 shows how a circular disc 1 is arranged to rotate about a vertical centre axis 2 with the help of a motor, not shown on the drawing. Above the disc there is on the one hand an annular guide rail 3 which is arranged at some distance above the disc and substantially at the periphery of the same, on the other hand a funnel-shaped magazine 4 which at its bottom end has an outlet orifice 5 which terminates at some distance above the rotating disc 1 and substantially in the vicinity of the central area of the same. From the rotating disc 1 extends a feed channel 6, whose input end is horizontal and connects with a negligible intervening space onto the likewise horizontal and plane working surface 7 of the disc 1 (seen more clearly in FIG. 2). Above the horizontal input end of the feed channel 6 is a band conveyor 8 driven by a separate motor (not shown). The band conveyor 8 and the feed channel 6 together form a feeding out element, which together with adjoining parts is shown on a larger scale in FIG. 2, where the same reference numerals are used as in FIG. 1. From FIG. 2 can also be seen the form of the caps which are to be handled by this arrangement. Thus each cap comprises a circular cap body 10 which is provided with a number of sealing rings which are not important in respect of the invention and will therefore not be described in detail. The cap body 10 has a substantially plane top surface (turned downwards in FIG. 2) and a projection 11 or lug projecting at an angle therefrom which is used when a bottle closed with the cap is to be opened. This type of cap is manufactured from a flexible plastic material which means that after deformation it reassumes its original shape.

As can be seen from the figures, the guide rail 3 is designed as an uninterrupted ring which is situated coaxially in ralation to the rotating disc and at some distance from the same. The annular guide rail has an inside diameter which is slightly less than the outside diameter of the rotating disc. The guide rail is at such a distance above the rotating disc that the distance between the bottom edge of the guide rail facing the disc and the working surface 7 is greater than the height of the cap body 10 but less than the total height of the cap 9, that is to say the vertical distance between the substantially plane top surface of the cap and the free end of the projection 11, when the cap is in the position shown in FIG. 2 with the top side resting against the working surface 7.

At a suitable point along the periphery of the annular guide rail there is a feeding out element comprising the band conveyor 8 serving as a driving element, whose effective band portion 13 moves radially in relation to the rotating disc 1 and substantially horizontally at some distance above the plane of the feed channel 6 and the horizontal input end. The end of the band conveyor 8 facing the rotating disc 1 passes over a freely rotating tail pulley 12 which is located directly adjoining the outer surface of the guide rail 3 or is recessed in a cavity in the guide rail. The band conveyor is driven by means of a motor (not shown) and is appropriately adjustable in its height, so that the distance between the effective lower band portion 13 of the conveyor and the plane working surface of the feed channel 6 or the disc 1 can be adjusted as a function of the height of caps fed out. It is possible to make the band conveyor spring-loaded in the direction of the working surface, so that the distance is adjusted automatically by the passing caps thus eliminating the need for a manual adjustment.

When the arrangement in accordance with the invention is used for the orientation and feeding out of caps, these are filled into the funnel-shaped magazine 4, from the outlet orifice 5 of which they are allowed to fall freely down onto the rotating disc 1. The supply of caps from the magazine can be adjusted manually or with the help of e.g. a photocell element which as a function of the number of caps on the disc 1 stops and opens the supply from the magazine 4. When the caps drop onto the disc which rotates at a relatively high speed, approx. 100 revolutions per minute, they are thrown by the centrifugal force outwards against the annular guide rail 3. Through contact with the disc and guide rail the caps constantly change position until they end up in their one relatively stable equilibrium position, that is to say with their plane top side resting against the working surface of the disc 1 and with the projection 11 at an angle upwards from the surface. As soon as the cap has landed in this position, it is driven by the force, produced through the continued rotation of the disc, out into the space between the guide rail and the working surface 7, the guide rail engaging at the same time with the projection 11 and swinging the cap so that it ends up in the position shown in FIG. 2, with the cap body at the periphery of the disc and the projection resting against the surface of the guide rail 3 facing inwards. In this position the cap moves along with the rotating disc until the latter reaches the point at which the band conveyor arranged radially, extends with its one end in over the periphery of the disc 1. Provided the band conveyor is in operation (the band conveyor is appropriately controlled by a photocell arranged further down in the feed channel 6), the bottom portion 13 of the band will engage with the cap body 10 and, co-operating with the plane upper working surface of the disc 1 or the feed channel 6, cause the cap to pass under the guide rail 3 while at the same time bending down the projection 11. The continued advance with the help of the band conveyor 8 moves the cap over the space between disc and feed channel and further in between two guide rails 14 arranged on either side of the feed channel 6, which guide the cap flung forwards by the band portion 13 along the feed channel 6.

The conveyor 8, as described earlier, will fling out from the disc 1 every cap that has been oriented in the correct position with the cap body under the guide rail and the projection resting against the inner surface of the guide rail. In order to regulate the supply of caps to the feed channel 6 and to the capping machine located at the output end of the feed channel it is appropriate, therefore, to operate the driver element or band conveyor 8 intermittently by means of a separate motive element which is controlled by a photocell arranged at a suitable point or directly by the capping machine. When the band conveyor 8 is not in operation, the cap bodies oriented at the periphery of the disc 1 will pass the conveyor without being influenced. Since the guide rail 3 is not provided with cavities or other irregularities, which might hinder the caps sliding along the rail, these can rotate in oriented position, turn after turn with the disc 1, until the band conveyor 8 has been started again and commences to feed out caps from the disc.

The arrangement in accordance with the invention works very reliably and with high capacity, so that earlier problems with incorrectly turned and missing caps are therefore completely eliminated. Through the design with a continuous, annular guide rail without recesses, guide plates or the like a serious source of error is avoided which was liable not only to bring about unreliable operation, but in certain cases also caused damage to the caps fed out.

We claim:

1. Apparatus for the oriented feeding out of caps of the type having a cap body and a projection arranged at an angle thereto, comprising:
    a rotating disc with a planar working surface onto which the caps are fed in random orientation;
    a guide rail, in the form of a continuous ring arranged coaxially with the disc and a lower periphery of the ring being spaced at a uniform continuous height above the working surface of the disc, for guiding the caps upon rotation of the disc so that the cap body projects under the guide rail and the projection contacts the guide rail to stop the cap; and
    feeding-out means arranged adjacent the guide rail to engage the cap body and pull the cap beneath and past the guide rail with the projection being bent downwardly when clearing the ring.

2. The apparatus of claim 1, wherein the distance between the guide rail and the working surface is greater than the height of the cap body but less than the total height of the cap.

3. The apparatus of claim 1, wherein the feeding-out means comprises a driving element movable substantially radially relative to the rotating disc and arranged to engage the cap body.

4. The apparatus of claim 3, wherein the driving element comprises an endless band conveyor, a tail pulley of which is positioned directly adjoining the cap bodies projecting beneath the guide rail.

5. The apparatus of claim 3 or 4, wherein the driving element is intermittently actuable.

6. An apparatus for orienting and feeding closure caps which each have a cap body and a bendable projection arranged at an angle thereto, comprising:
    feeding means for feeding a plurality of closure caps;
    a rotating disk onto which said plurality of caps are fed in random orientation, each of said plurality of caps being propelled by centrifugal force outwardly to an outer periphery of said disk;
    a continuous retaining ring for retaining each of said plurality of caps on said disk, a lower periphery of said retaining ring being spaced at a uniform continuous height coaxially above said disk and having a diameter slightly smaller than a diameter of said disk, said retaining ring and said disk cooperating to orient at least one of said plurality of caps such that the cap body extends radially outwardly under said retaining ring towards an outer periphery of said disk with the projection contacting an inner surface of said retaining ring to prevent further unrestrained radial outward movement by the cap; and
    conveying means for conveying the cap substantially radially away from said disk, wherein the cap projection is bent downwardly towards a center of the disk to enable the cap to clear said retaining ring and the cap projection flexes back to near its original orientation after clearing said retaining ring.

* * * * *